Patented Apr. 15, 1924.

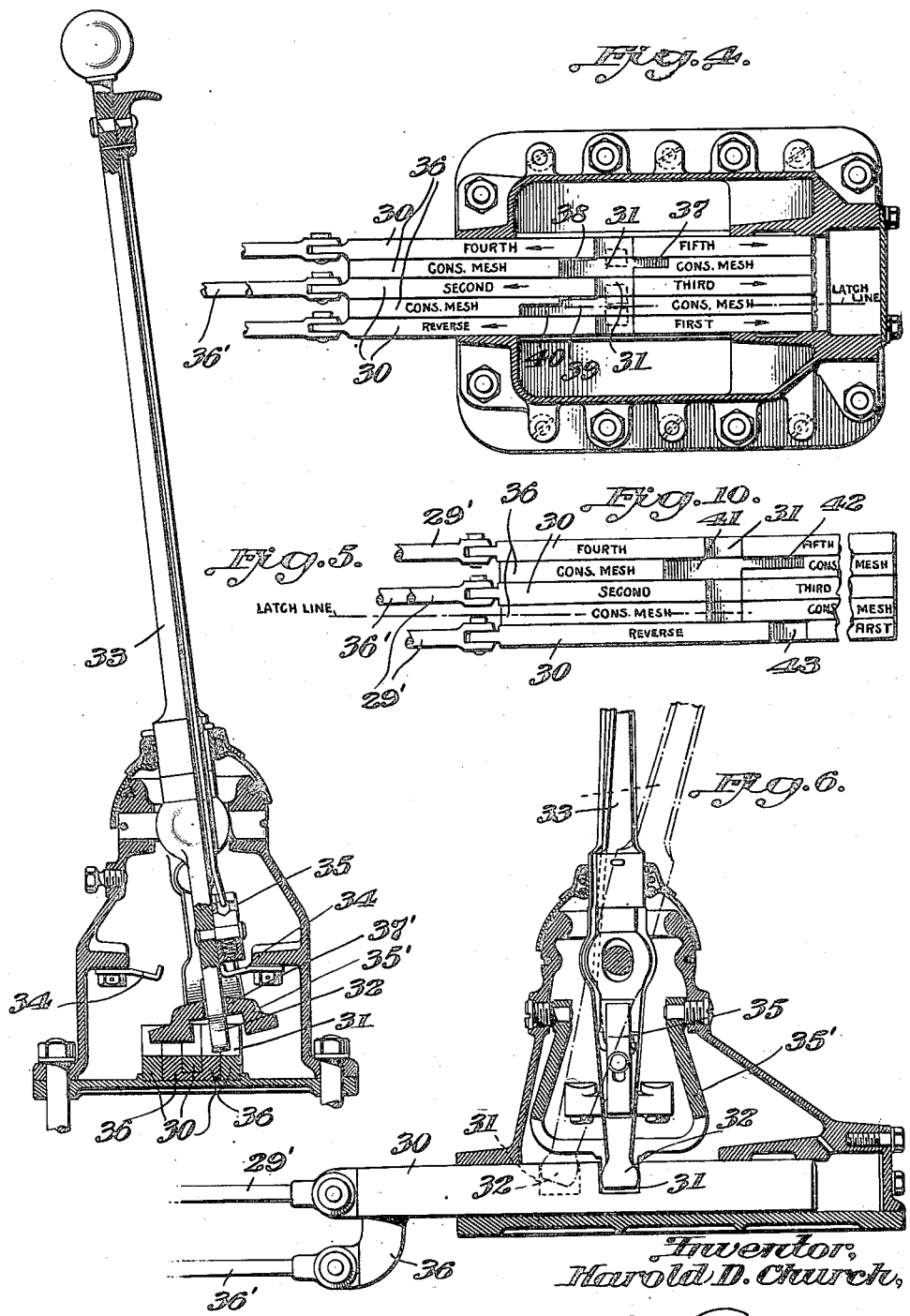

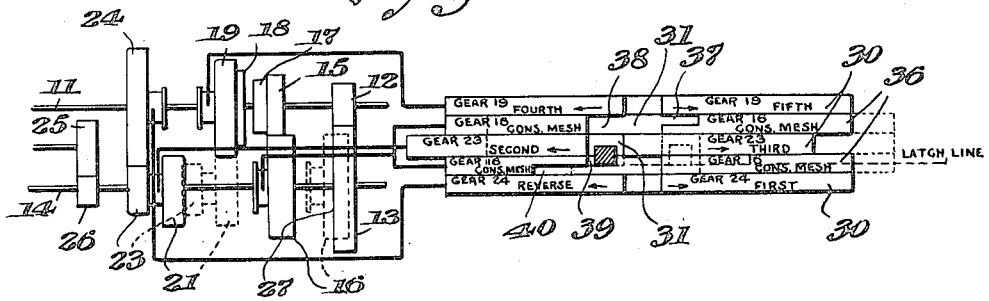
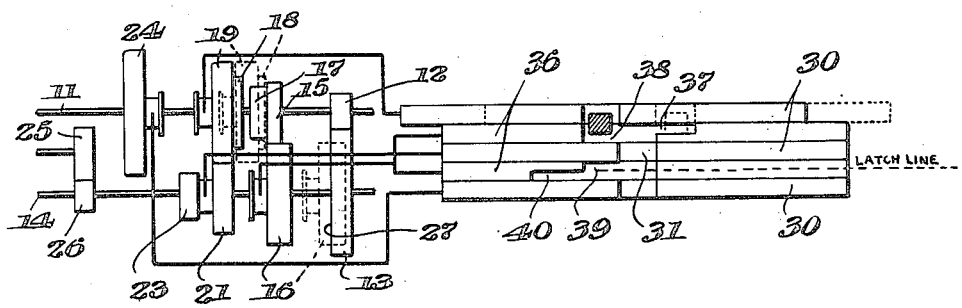
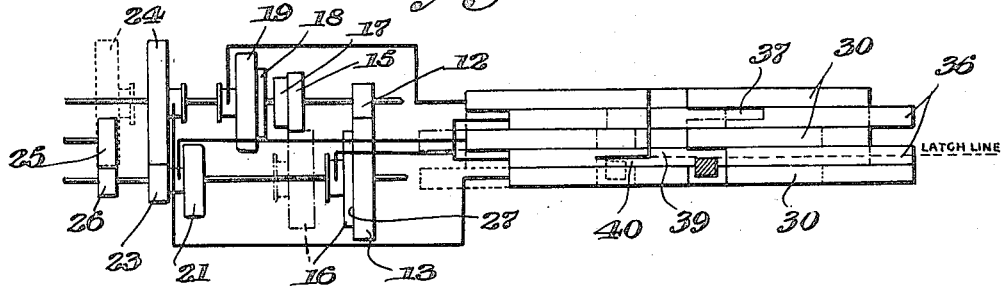

1,490,206

UNITED STATES PATENT OFFICE.

HAROLD D. CHURCH, OF PRINCETON, NEW JERSEY, ASSIGNOR TO PACKARD MOTOR CAR COMPANY, OF DETROIT, MICHIGAN, A CORPORATION OF MICHIGAN.

MOTOR VEHICLE.

Application filed January 12, 1920. Serial No. 350,813.

*To all whom it may concern:*

Be it known that I, HAROLD D. CHURCH, a citizen of the United States, and resident of Princeton, Mercer County, State of New Jersey, have invented certain new and useful Improvements in Motor Vehicles, of which the following is a specification.

This invention relates to motor vehicles and more particularly to change speed mechanisms.

The principal object of the invention is to provide a change speed mechanism capable of obtaining a greater number of speeds than possible with motor vehicle transmissions heretofore employed with an equally compact design and an equally simple mode of operation.

Another object of the invention is to provide means to obtain a plurality of reverse speeds in conjunction with the increased number of forward speeds.

Other objects of the invention will appear from the following description.

The invention is embodied in preferable form in the construction hereinafter described and illustrated in the accompanying drawings, in which drawings:

Figure 4 is a plan view of an arrangement of shifter bars which may be used in conjunction with the gear mechanism;

Figure 5 is a vertical section partly in elevation taken at right angles to Figure 4 and showing the shifter bars and the gear shift lever;

Figure 6 is a vertical section at right angles to Figure 5, showing the gear shift lever and the bars;

Figure 7 is a diagram illustrating the positions of the various gears and their operating rails in full lines for the second speed position and with the shifted parts in dotted lines for third speed position;

Figure 8 is a diagram illustrating the positions of the parts for fourth and fifth speed adjustments, the parts being shown in full lines in fourth speed and with the new positions which the parts occupy when shifted to effect 5th speed indicated in dotted lines;

Figure 1:
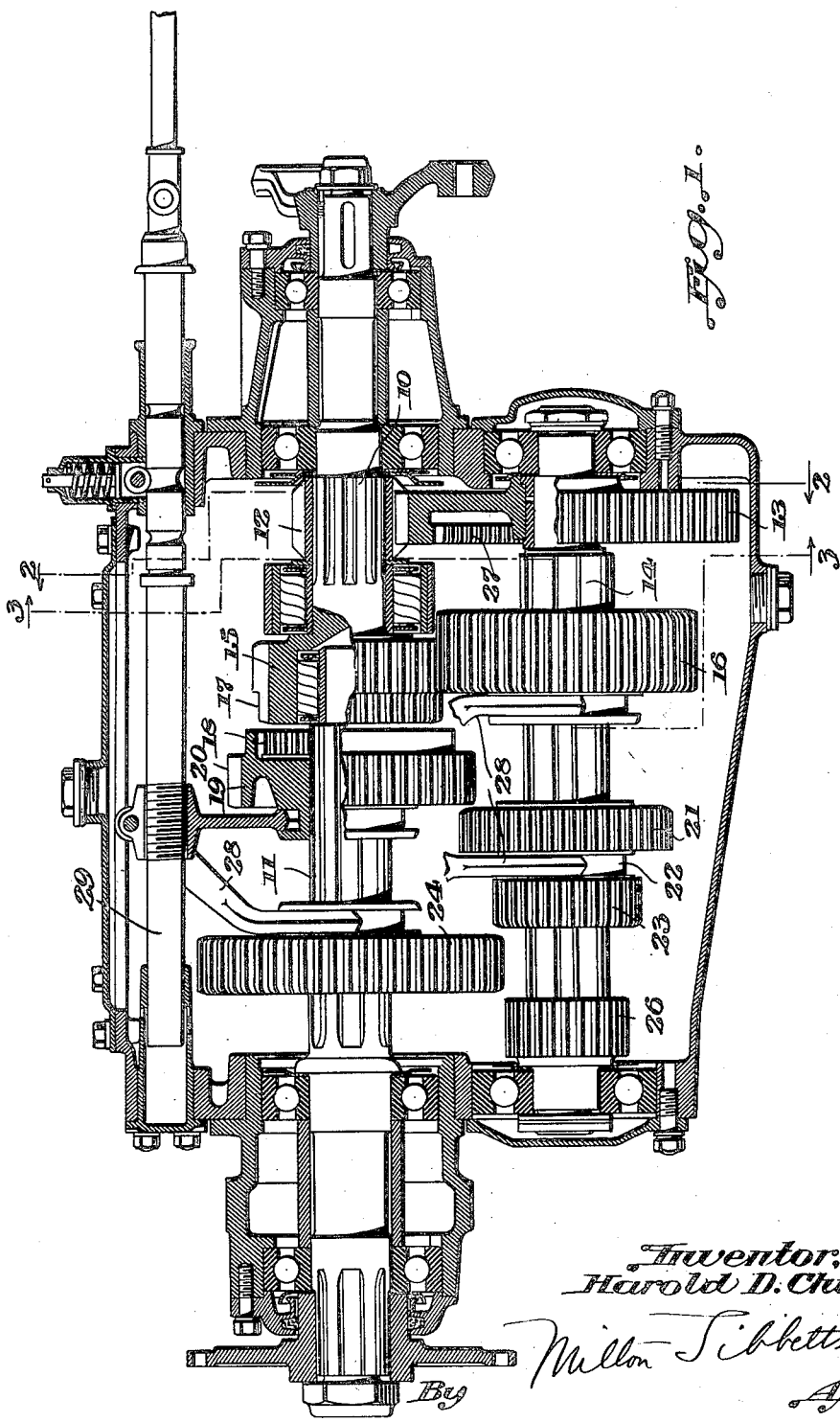
Figure 1 is a section through the gear box of a transmission mechanism.

Figure 9 is a diagram indicating the positions of the parts for first speed forward, low reverse speed and high reverse speed, the positions of the parts for first speed forward being indicated by full lines, those parts which are shifted to effect the low reverse speed being indicated by dotted lines and the additional change in position from low reverse speed to high reverse speed being indicated by dot and dash lines, and Figure 10 is a view similar to Figure 4 illustrating another form of shifter bars or rails adapted for the operation of the particular change speed mechanism herein illustrated and described.

Referring to the drawings, 10 indicates that section of the transmission shaft which is adapted to be connected to the motor and constitutes the driving element of said shaft and 11 indicates the section thereof which is adapted to be driven and is connected to the universal joint shaft. Fixed on the forward part of the driving shaft section 10 is a low speed, so-called constant mesh driving gear 12 adapted to have continuous engagement with a large gear 13 which is mounted to rotate freely on a counter shaft 14. Also fixed on the shaft section 10 is a gear 15 having a greater number of teeth than the gear 12 and which is adapted to be engaged by a gear 16 mounted on the counter shaft and splined thereto so as to rotate therewith but be capable of longitudinal sliding movement on the shaft. This gear 16 has a less number of teeth than the gear 13. The gears 12 and 15 constitute the so-called constant mesh driving gears of the transmission and the gears 13 and 16 constitute the constant mesh driven gears, although in respect to these latter gears the member 16 is movable into and out of engagement with the driving gear 15 and the gear 13 is normally loose on its shaft and adapted to be clutched thereto only when the gear 16 is released from its driving gear. The gears 12 and 15 in the present construction may be more properly characterized as "constant position gears" since the gear 15 is not at all times in mesh with its driven gear 16. However, the main and counter shafts are in constant engagement through one or the other combination, hence the term constant mesh applies to such relations and will be retained, for convenience.

The gear 15 is also provided with a reduced portion having exterior teeth 17 adapted to be engaged by the interior teeth 18 of a slidable direct drive gear 19 which is splined on the driven section 11 of the transmission shaft. The gear 19 is provided with external teeth 20 adapted for engagement with the teeth of a shiftable gear 21 which is mounted to slide on the counter shaft and which has a shift fork engaging collar 22 to which is fixed a gear 23 having a less number of teeth than the gear 21.

Figure 2:
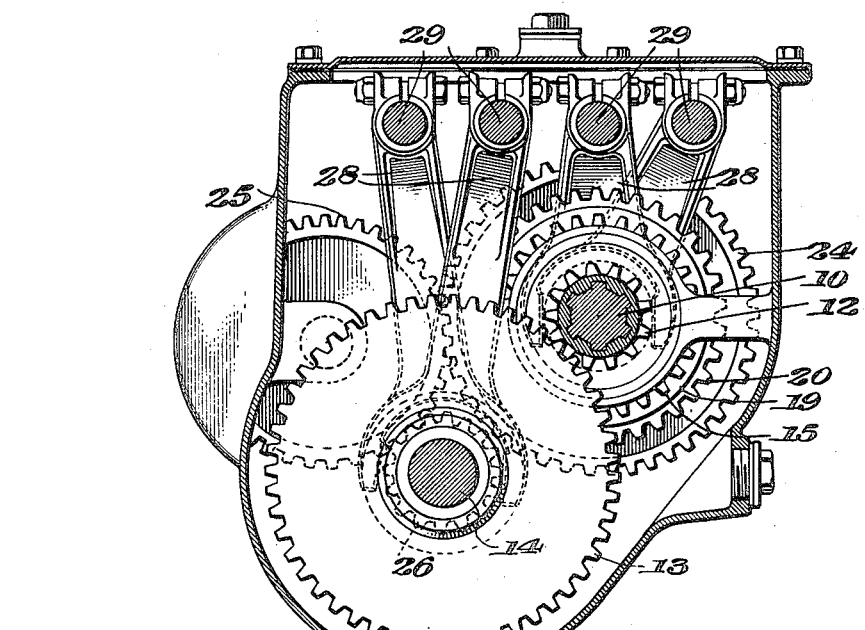
Figure 2 is an end view partly in vertical section taken at right angles to Figure 1 on the line 2—2.
Figure 3:
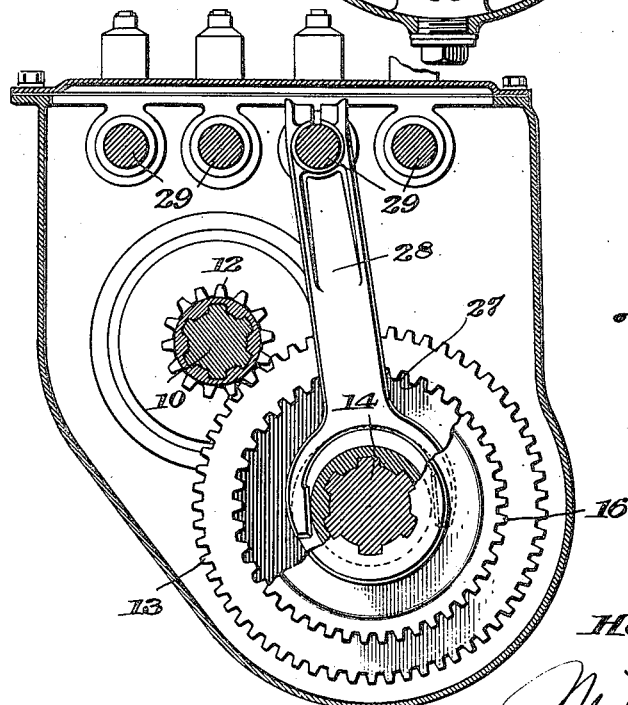
Figure 3 is a vertical section on the line 3—3 of Figure 1.

A shiftable gear 24 constituting a large first speed gear is adapted to have sliding movement on the driven section 11 of the main shaft and is adapted to be engaged either with the gear 23 or with a reversing gear 25 which is mounted on a stub shaft and engages the small gear 26 mounted on said counter shaft 14. (See Figure 2.)

The constant mesh counter shaft gear 13 which is mounted loosely upon its shaft is provided with internal teeth 27 with which the external teeth of the sliding gear 16 also mounted on the counter shaft, are adapted to engage when the gear 16 is shifted forward, so that the gear 13 will be locked to the counter shaft and the latter driven thereby from the gear 12.

Referring now to the shifter mechanism and particularly to the mechanism illustrated in Figures 2 to 6 inclusive 28 indicates four shifter forks of usual construction adapted to engage the four grooved collars on the various shiftable gears of the change speed mechanism. These shifter forks are mounted at their upper ends, as is usual, upon longitudinally reciprocable shifter fork shafts 29. The shafts 29 are connected by links 29' and 36' to sliding operating bars 30, 36, four in number. These bars are provided, as is usual, with slots 31 which are adapted to receive for the purpose of operation, a lug 32 at the lower end of a universally mounted gear shift lever 33. One of these bars is adapted to control the shifting of the gear 19 to effect fourth and fifth speeds, when the bar is moved alternately in opposite directions. Another bar is adapted to control the shiftable member 16 of the constant mesh gears, another bar is adapted to control the gears 21 and 23 for second and third speeds and another bar the gear 24 for effecting the reverse and first speeds, the bars thus described being correspondingly designated in the drawings, in Figure 4.

Limit stops for the lateral movement of the lever are provided. See Figures 5 and 6. The position of the stops is such that the engaging lug 32 of the operating lever overlaps from one bar to another. By this arrangement the lug engages two adjacent sliding bars so as to effect the common movement thereof. Thus the common movement of the gear 16 into engagement with the gear 13 and that of the gear 21 into engagement with the gear 19, is rendered possible and also the common movement of the gear 16 into engagement with the gear 15 and of the gear 19 into engagement with the gear 21 to obtain fourth speed forward.

The limit stops for the shift lever referred to are designated 34. A latch or movable abutment 35 on the lever is adapted to bear against one stop so as to confine the lug of the lever normally to alinement respectively with one section of the constant mesh bar and second and third speed bar, jointly, and with the bar controlling fourth and fifth speeds and the other constant mesh section, so that when the latch is down the lever may be shifted only either to the extreme left or extreme right to effect either one of the above two engagements. The latch may be withdrawn by hand out of alinement with the stop to permit the lug of the lever to be swung into common alinement with a section of the constant mesh bar and the bar controlling the reverse and first speeds. A swinging locking member 35' is mounted in the lever casing and is provided with a slot 37' with which engages the lug 32 whereby the member is adapted to be swung into position to lock.

In this arrangement it is possible to obtain two reverse speeds and also it is possible to effect the seven combinations of adjustment required for five forward speeds and two reverse speeds with the number of slots customarily used in four speed forward and one reverse mechanisms. To this end the constant mesh member is made in two connected bars or sections extending between the other bars and is indicated on the drawings herein as 36 and the link connecting it to its shaft as 36'. One of such sections is provided with a slot 37, half the width of the section, and with an alined full width slot 38. The other section is provided with a full slot 39 and half slot 40.

The lever shifting to effect the various speed changes with the above mechanism is as follows:

In Figures 1 and 4 the gears and shifter rails or bars are respectively shown in neutral position.

For second speed forward, which is that corresponding to the usual low speed used in four speed transmissions, assuming that the gear 16 is engaged with the gear 15, the lever lug 32 is swung to the right in Figure 5, the latch being down so as to contact with 34 so as to aline the lug with the "second-third" bar and slot 39 and moved in the direction of the "second" arrow so as to carry gear 23 into engagement with gear 24, in the meanwhile constant mesh gear 16 remaining in mesh with gear 15, the constant mesh bar not being operated since the lug will move freely in the slot 39. The parts will then occupy the position shown in full lines in Figure 7. The two wings of the lock 35' will be alined with adjacent bars on either side to prevent movement of such bars.

To obtain third speed forward the lug of the shifting lever is moved directly forward by shifting the upper end of the lever back and the lug carries the rail or bar back in the direction of the arrow marked "third" so as to thereby shift the gear 21 connected to said rail forward into engagement with the gear 19, at the same time the constant mesh bar will be shifted in the same direction as the "third" bar, thus carrying the gear 16 into engagement with the internal teeth 27 of the gear 13, so that the drive will be from the gear 12 to gear 13, counter shaft 14, gear 21 and gear 19 on the main shaft 11. The position of the parts in obtaining this third speed adjustment is indicated in dotted lines in Figure 7. The slots 38 and 39 permit the movement of the rail 36 without contact thereof with the lock 35'.

For fourth speed the lug is moved from third speed position back to neutral carrying the gear 21 back to neutral and moved over laterally into engagement with the slot of "fourth-fifth" bar, the slot 38, which is not in alignment with the slots 31, permitting the passage of the lug and lock. One wing of the lock 35' will swing out beyond the said fourth speed bar and the other wing will prevent movement of the "first-reverse" and "second-third" bars. The parts will then occupy the position shown in full lines in Figure 8. Then the lug is moved in "fourth" direction, carrying the end bar and also the constant mesh bar owing to the fact that the end of slot 38 has been previously carried up flush with the end of the outer bar. The gear 19 is thus carried into engagement with gear 21 and gear 16 with gear 15.

For fifth speed, the corresponding bar is moved in the direction of the arrow for "fifth," shifting gear 19 into engagement with teeth 17 of gear 15, for direct drive, and the slot 37 permitting movement of the lug without actuation of the constant mesh bar, as shown in dotted lines in Figure 8.

To obtain first speed forward, which is the additional low speed provided in this invention, the latch 35 is lifted, and the lug moved laterally past the stop 34 into engagement with the slot in the "reverse-first" bar and also the slot in the adjacent section of the constant mesh bar and into the position shown in Figure 5 and then shifted in the direction indicated by the corresponding arrow in Figure 4 to carry the gear 24 into mesh with gear 23 and gear 16 into mesh with gear 13, as shown in full lines in Figure 9.

For reverse speed, the lever lug may be shifted from the second speed position to obtain relatively high speed in reverse. This operation may be effected owing to the fact that in second speed position the end of the "second" bar will be flush with the end of the slot 39 so that after the latch is raised the lug may be moved into and through slot 39, and forward into the slot of the reverse bar, and then the reverse bar operated, the slot 40 permitting the movement of the lug without contact with the constant mesh bar. The position of the parts for this adjustment is indicated in dot and dash lines in Figure 9.

To obtain low reverse speed, after the "first-reverse" bar has been shifted to obtain first speed forward carrying the constant mesh bar with it so as to carry gear 16 into mesh with gear 13, and the end of the slot 39 out flush with ends of the slots 31, the lug is shifted back carrying the reverse bar in the opposite direction so as to carry gear 24 into mesh with gear 25 but leaving the constant mesh bar stationary owing to the free movement of the lug in the slot 40. The position of the parts in the low reverse adjustment is indicated in dotted lines in Figure 9.

In Figure 10 an alternative arrangement of the gear shifter bars adapted to obtain through its particular arrangement of slots the combinations necessary for producing five forward and one reverse speeds, is illustrated. This construction is not capable of the additional reverse speed. Similarly to the construction in the immediately preceding figures, a constant mesh bar is provided having two connected limbs which extend between the other bars. In this arrangement the line of the stop for the latch is between the bar corresponding to second and third speeds and the adjacent portion of the constant mesh shifter member on the line indicated, and the lower end of the lever when the latch is raised is adapted to engage only the constant mesh bar or only the reverse and first speed bar so that the constant mesh bar may be first shifted until its slots is in alinement with the normally unalined slot of the reverse and first speed bar and then moved to the slot of the latter, and said bar operated.

Slots 41 and 42 correspond in location and function to slots 38 and 37 respectively of Figure 4. Slot 43 of the "reverse-first" bar is out of alinement with the slots 31. First speed is obtained by lifting the latch and engaging the slot in the constant mesh bar and then shifting said bar until its slot is opposite the slot 43 and then moving the lug to the latter and shifting the first speed bar. Reverse speed is obtained by shifting the "reverse-first" bar from the position just described in the opposite direction.

Having thus described my invention, what I claim and desire to secure by Letters Patent is:

1. In a motor vehicle, a change speed mechanism including a driving shaft, a counter shaft, shiftable gears for obtaining varying speeds. two constant position gears on said driving shaft, a free fixed position gear on the counter shaft adapted to engage one of said driving shaft gears and a shiftable gear splined to said counter shaft adapted to engage the other constant position gear of the driving shaft.

2. In a motor vehicle, a change speed mechanism having a two part main shaft, a counter shaft, driving gears on one part of said main shaft, a driven gear on the other part, a free gear on said counter shaft adapted to engage one of said driving gears, a slidable gear splined to said counter shaft, means to effect the engagement of said counter shaft gears to thereby lock the first gear to its shaft and means to drive said driven gear of the second part of the driving shaft from the counter shaft.

3. In a motor vehicle, a change speed mechanism having a drive shaft in two parts and a counter shaft, a free gear on said counter shaft, a gear on said drive shaft having constant mesh with said free gear, a gear on said counter shaft fixed to rotate therewith but movable longitudinally thereof, means of engagement between said fixed and free gears, said respective pairs of gears being of different ratios.

4. In a motor vehicle, a change speed mechanism including a drive shaft having a driving part and a driven part, a counter shaft, shiftable gears on said driven part, shiftable gears on the counter shaft, non-shifting gears of different size on the driving part, a free gear on the counter shaft in constant mesh with one of said non-shifting gears, a shifting gear splined on the counter shaft and adapted to engage the other non-shifting gear. and means of engagement between said last named counter shaft shifting gear and said non-shifting gear to lock the latter to the shaft.

5. In a motor vehicle, in combination, a change speed gear box including shiftable gears for speed changing and a reversing gear, gear shifting sliding bars. a shifter lever adapted to engage said bars, means establishing the operating condition of the reversing gear conjointly with either of a plurality of adjustments of the speed changing gears.

6. In a motor vehicle, in combination, with a change speed gear box, including a reversing gear, gear shifting slidable bars, a shifter lever, said bars being slotted to receive said lever, and one of said bars being conjointly movable with some of said other bars and not with others.

7. In a motor vehicle. in combination with a change speed gear box, including constant mesh gears one of which is movable, and a reversing gear, gear shifting bars. a shifter lever adapted to engage said bars, the bars being slotted to permit the shifting of the lever, said slots being so formed as to permit the passage of the end of the lever from either of two forward speed positions of the lever and bars to reverse speed position.

8. In a motor vehicle, in combination with a change speed gear box. slotted shifter bars, a shifter lever, one of said bars having sections extending between the other bars and adapted for conjoint operation with certain of said other bars by said lever.

9. In a motor vehicle, in combination with a change speed gear box including constant mesh gears adjustable for different ratios, and other shiftable gears, slotted shifter bars, a shifter lever, one of said bars controlling the adjustment of the constant mesh gears and extending under the other bars, said bars being slotted to permit the engagement therewith of said lever and the said constant mesh bar having certain of its slots between adjacent bars elongated beyond the length of the other slots to permit the movement of certain adjacent bars independently of one another.

10. In a motor vehicle, in combination with a change speed gear box including constant mesh gears adjustable for different ratios, and other shiftable gears adjacent slotted bars for shifting said shiftable gears, one of said bars controlling the adjustable member of the constant mesh gears and movable with either of two other bars, said constant mesh bar having slots elongated in the direction of its length permitting relative independent movement of the constant mesh bar and said two other bars and having other slots permitting the transfer of the lever from engagement with one of said bars separate from the constant mesh bar while the bar is in operated position directly to engagement with the other of said bars.

In testimony whereof I affix my signature.

HAROLD D. CHURCH.